(12) United States Patent
Masuda

(10) Patent No.: US 9,425,987 B2
(45) Date of Patent: *Aug. 23, 2016

(54) COMPUTER SYSTEM AND VISUALIZATION METHOD OF VIRTUAL NETWORK

(71) Applicant: Takahisa Masuda, Tokyo (JP)

(72) Inventor: Takahisa Masuda, Tokyo (JP)

(73) Assignee: NEC Corporation, Tokyo (JP)

( * ) Notice: Subject to any disclaimer, the term of this patent is extended or adjusted under 35 U.S.C. 154(b) by 19 days.

This patent is subject to a terminal disclaimer.

(21) Appl. No.: 14/376,831

(22) PCT Filed: Feb. 5, 2013

(86) PCT No.: PCT/JP2013/052527
§ 371 (c)(1),
(2) Date: Aug. 5, 2014

(87) PCT Pub. No.: WO2013/118690
PCT Pub. Date: Aug. 15, 2013

(65) Prior Publication Data
US 2015/0036538 A1 Feb. 5, 2015

(30) Foreign Application Priority Data
Feb. 10, 2012 (JP) .................. 2012-027780

(51) Int. Cl.
*H04L 1/00* (2006.01)
*H04L 12/46* (2006.01)
(Continued)

(52) U.S. Cl.
CPC ........... *H04L 12/4641* (2013.01); *H04L 41/12* (2013.01); *H04L 45/38* (2013.01); *H04L 49/70* (2013.01); *H04L 45/02* (2013.01); *H04L 45/586* (2013.01)

(58) Field of Classification Search
CPC ....... H04L 45/42; H04L 45/34; H04L 45/48; H04L 47/125; H04L 12/462; H04L 45/00; H04L 45/16; H04L 45/24; H04L 45/44; H04L 47/10; H04L 39/358; H04L 67/1002; H04L 67/1061
USPC ....... 370/229, 230, 248, 252, 254, 255, 328, 370/351, 389, 392, 408, 420, 503, 509, 512
See application file for complete search history.

(56) References Cited

U.S. PATENT DOCUMENTS

| 5,892,912 A | 4/1999 | Suzuki et al. |
| 5,948,055 A | 9/1999 | Pulsipher et al. |

(Continued)

FOREIGN PATENT DOCUMENTS

| JP | 2006-019866 A | 1/2006 |
| JP | 2011-160363 A | 8/2011 |

(Continued)

OTHER PUBLICATIONS

English Translation of International Preliminary Report on Patentability in PCT No. PCT/JP2013/052527 dated Aug. 12, 2014.

(Continued)

*Primary Examiner* — Dady Chery
(74) *Attorney, Agent, or Firm* — McGinn IP Law Group, PLLC

(57) ABSTRACT

A controller of the present invention specifies a transmission virtual node and a reception virtual node of packet data by acquiring from a switch, a reception notice of packet data transferred between virtual networks which are managed by different controllers. A managing unit combines the virtual networks managed by the different controllers by using the transmission virtual node and the reception virtual node as common virtual nodes. Thus, the whole virtual network which is controlled by the plurality of controllers using an open flow technique can be managed by one source.

17 Claims, 9 Drawing Sheets

(51) Int. Cl.
H04L 12/721 (2013.01)
H04L 12/24 (2006.01)
H04L 12/931 (2013.01)
H04L 12/751 (2013.01)
H04L 12/713 (2013.01)

(56) References Cited

U.S. PATENT DOCUMENTS

| | | | |
|---|---|---|---|
| 7,681,130 | B1 | 3/2010 | Lavallee et al. |
| 8,392,608 | B1 | 3/2013 | Miller et al. |
| 8,824,274 | B1 | 9/2014 | Medved et al. |
| 2003/0046390 | A1 | 3/2003 | Ball et al. |
| 2003/0115319 | A1 | 6/2003 | Dawson et al. |
| 2004/0061701 | A1 | 4/2004 | Arquie et al. |
| 2006/0002311 | A1 | 1/2006 | Iwanaga et al. |
| 2006/0034297 | A1 | 2/2006 | O'Neill |
| 2006/0182034 | A1 | 8/2006 | Klinker et al. |
| 2008/0144625 | A1 | 6/2008 | Wu et al. |
| 2009/0077478 | A1 | 3/2009 | Gillingham et al. |
| 2009/0138577 | A1 | 5/2009 | Casado et al. |
| 2010/0040366 | A1 | 2/2010 | Jenkins et al. |
| 2011/0246669 | A1 | 10/2011 | Kanada et al. |
| 2011/0283017 | A1 | 11/2011 | Alkhatib et al. |
| 2011/0317701 | A1* | 12/2011 | Yamato .................. H04L 49/25 370/392 |
| 2012/0158395 | A1 | 6/2012 | Hughes et al. |
| 2012/0177041 | A1 | 7/2012 | Berman |
| 2013/0058215 | A1 | 3/2013 | Koponen et al. |
| 2013/0058255 | A1 | 3/2013 | Casado et al. |
| 2013/0058350 | A1 | 3/2013 | Fulton |
| 2013/0064079 | A1 | 3/2013 | Zhang |
| 2013/0128891 | A1 | 5/2013 | Koponen et al. |
| 2013/0212243 | A1 | 8/2013 | Thakkar et al. |

FOREIGN PATENT DOCUMENTS

| | | |
|---|---|---|
| JP | 2011-166384 A | 8/2011 |
| JP | 2011-166692 A | 8/2011 |
| WO | WO 2009/029303 A1 | 3/2009 |
| WO | WO 2011/083780 A1 | 7/2011 |

OTHER PUBLICATIONS

International Search Report in PCT/JP2013/052527 dated Apr. 9, 2013 (English Translation Thereof).
Toshindai no OpenFlow Part 2 [Data Center deno Katsuyo Scene] VLAN, Multi Tenant, "Mieru-ka" Kizon Gijutsu ga Kakaeru Kadai o Kaiketsu, Nikkei Communications, Feb. 1, 2012, No. 577, pp. 20 to 23 (with partial English Language concise explanation).
OpenFlow Switch Specification Version 1.1.0 Implemented (Wire Protocol 0x02) (Feb. 28, 2011).
Extended European Search Report dated May 21, 2015.
English translation of the International Preliminary Report on Patentability in PCT No. PCT/JP2013/052523 dated Aug. 12, 2014.
Extended European Search Report dated Aug. 13, 2015.
Melander, et al., "VIBox—Virtualized Internets-in-a-Box: A tool for network planning experimentation", Telecommunications network strategy and planning symposium (networks), 2010 14th International, IEEE, Sep. 27, 2010, p. 1-6, XP031828817.
Pisa, et al., "VNEXT: Virtual Network management for Xen-based Testbeds", Network of the Future (NOF), 2011 International conference on the, IEEE, Nov. 28, 2011, p. 41-45, XP032093094.
SPARC ICT-258457 Deliverable D3.3 Split Architecture for Large Scale Wide Area Networks, Dec. 1, 2011, XP055139597, URL: http://www.fp7-sparc.eu/assets/deliverables/SPARC_D3.3_Split_Architecture_for_Large_Scale_Wide_Area_Networks.pdf.
United States Office Action dated Apr. 20, 2016 in co-pending U.S. Appl. No. 14/377,469.

* cited by examiner

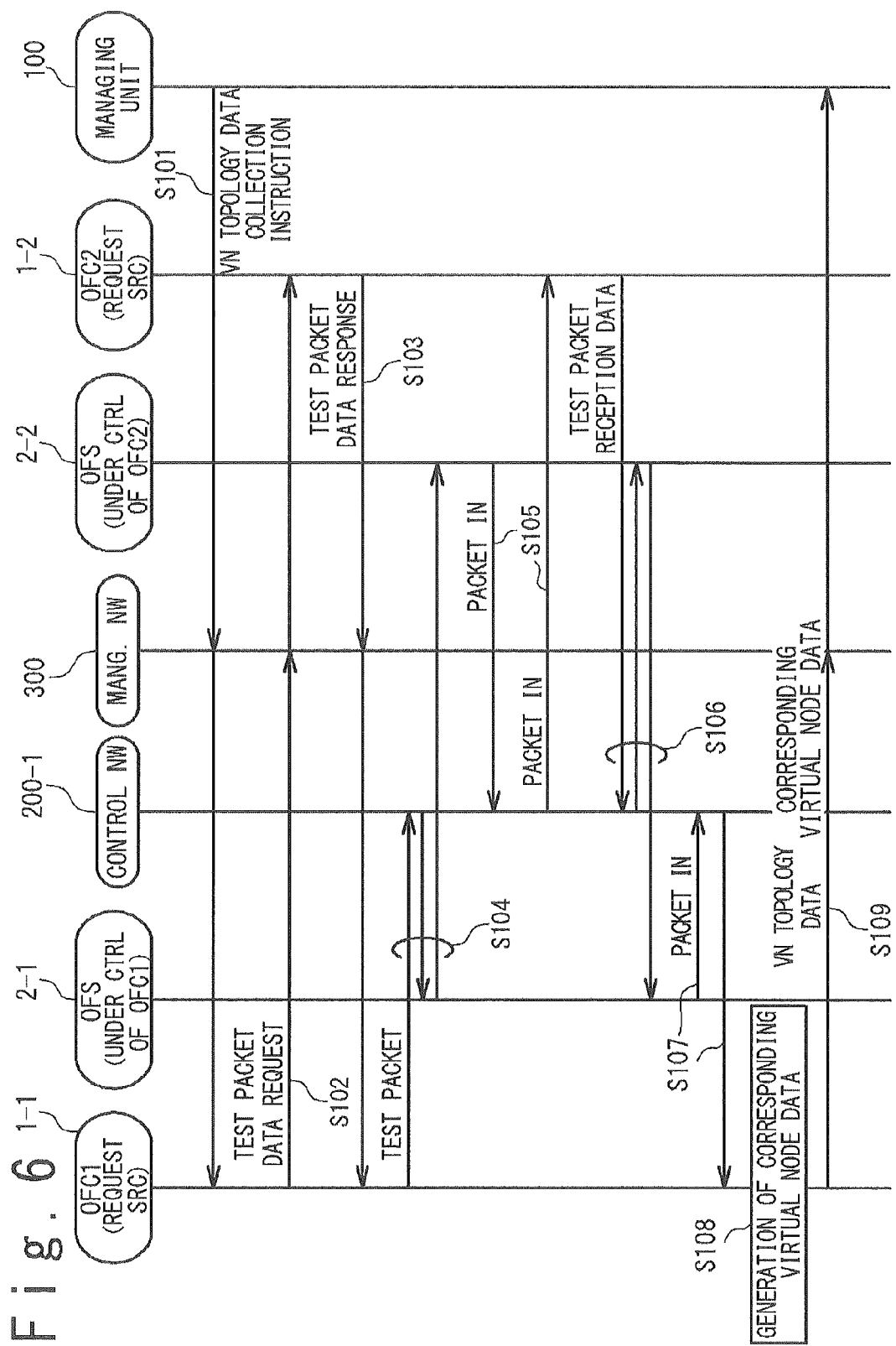

Fig. 7

| | TEST PACKET DATA REQUEST | DST ADDR. DATA | TEST PACKET | TEST PACKET RECEP. DATA |
|---|---|---|---|---|
| DST MAC | MAC OF OFC2 | MAC OF OFC1 | HOST MAC OF OFC2 VTN1 | HOST MAC OF OFC1 VTN1 |
| SRC MAC | MAC OF OFC1 | MAC OF OFC2 | HOST MAC OF OFC1 VTN1 | HOST MAC OF OFC2 VTN1 |
| DST IP | MANG. IP OF OFC2 | MANG. IP OF OFC1 | HOST IP OF OFC2 VTN1 | HOST IP OF OFC1 VTN1 |
| SRC IP | MANG. IP OF OFC1 | MANG. IP OF OFC2 | HOST IP OF OFC1 VTN1 | HOST IP OF OFC2 VTN1 |
| PROTOCOL | UDP | UDP | UDP | UDP |
| UDP DATA1 | MESSG ID = 1 | MESSG ID = 2 | MESSG ID = 3 | MESSG ID = 4 |
| UDP DATA2 | ID NO. (= X) | ID NO. (= X) | ID NO. (= Y) | ID NO. (= Y) |
| UDP DATA3 | VTN NAME (= VTN1) | VTN NAME (= VTN1) | VTN NAME (= VTN1) | VTN NAME (= VTN1) |
| UDP DATA4 | | HOST IP OF VTN1 | | RECEP. VBRIDGE NAME |
| UDP DATA5 | | : (SPECIFY MULTIPLE) | | RECEP. VEXTERNAL NAME |

COMPUTER SYSTEM AND VISUALIZATION METHOD OF VIRTUAL NETWORK

TECHNICAL FIELD

The present invention is related to a computer system and a visualization method of a computer system, and especially, a visualization method of a virtual network of a computer system using an open flow technique (also, to be referred to as a programmable flow).

BACKGROUND ART

Conventionally, a plurality of switches on a route carried out the determination of a route for a packet from a transmission source to a transmission destination, and packet transfer processing. In recent years, in a large scale network such as a data center, the change of a network configuration often occurs because of the new addition of equipment for a scale expansion and the stop of equipment due to a failure. Therefore, the flexibility to cope with the change of the network configuration and to determine an appropriate route became necessary. However, because a program for route determination processing in the switch cannot be changed externally, the whole network cannot be controlled and managed in an integrated manner.

On the other hand, in a computer network system, an (open flow) technique of controlling a transfer operation of each of all the switches by an external controller is proposed by Open Networking Foundation (Non-Patent Literature 1). The network switch corresponding to this technique (hereinafter, to be referred to as open flow switch (OFS)) holds detailed data such as a protocol type and a port number in a flow table and can carry out the control of a flow and the collection of statistical data.

In a system using an open flow protocol, setting of a communication route and setting for a transfer operation (relay operation) to the switches OFS on the route are carried out by an open flow controller (hereinafter, to be referred to as OFC). OFC is also to be referred to as a programmable flow controller. At this time, the controller OFC sets in a flow table of the switch, a flow entry which a rule for specifying a flow (packet data) and an action for defining an operation to the flow are related to each other. The switch OFS on the communication route determines a destination of reception packet data according to the flow entry set by the controller OFC and carries out transfer processing of the packet data. Thus, a client terminal becomes possible to transmit and receive packet data to and from another client terminal by using the communication route set by the controller OFC. That is, in the computer system using an open flow technique, the controller OFC for setting the communication route and the switches OFS for carrying out the transfer processing are separated, and the communication of the whole system can be controlled and managed in an integrated manner.

Because the controller OFC can control the transfer between the client terminals in units of flows based on the header data of L1 to L4, the controller OFC can virtualize the network optionally. Thus, because the constraints of a physical configuration can be eased, the building of virtual tenant environment becomes easy, so that it is possible to reduce an initial investment cost by scale out.

When the number of terminals such as client terminals, servers, and storages to be connected with the system using the open flow technique increases, the load of the controller OFC which manages the flow increases. Therefore, in order to reduce the load of the controller OFC, there is a case where a plurality of controllers OFC are installed in one (network) system. Or, generally, because one controller OFC is provided for every data center, a plurality of the controllers OFC manage the network in the whole system in case of the system which has a plurality of data centers.

The system in which one network is managed by the plurality of controllers is disclosed in, for example, JP 2011-166692A (Patent Literature 1), JP 2011-166384A (Patent Literature 2), and JP 2011-160363A (Patent Literature 3). Patent Literature 1 discloses a system in which a plurality of controllers sharing topology data carries out the flow control of the network using the open flow technique. Patent Literature 2 discloses a system which includes a plurality of controllers which instruct the setting of a flow entry with a priority to switches on a communication route, and the switches which determine permission/non-permission of the setting of the flow entry according to the priority, and carry out a relay operation to a reception packet conforming with the flow entry set to itself. Patent Literature 3 discloses a system which includes a plurality of controllers which instruct the setting of a flow entry to switches on a communication route, and the switches which carry out a relay operation to a reception packet according to the flow entry set by a route determining controller as one of the plurality of controllers.

Citation List

[Patent Literature 1] JP 2011-166692A
[Patent Literature 2] JP 2011-166384A
[Patent Literature 3] JP 2011-160363A
[Non-Patent Literature 1] OpenFlow Switch Specification Version 1.1.0 Implemented (Wire Protocol 0x02) (Feb. 28, 2011)

SUMMARY OF THE INVENTION

When one virtual network is managed by a plurality of controllers, a situation of the virtual network can be grasped by each of the plurality of controllers. However, the whole virtual network which is managed by the plurality of controllers cannot be grasped as one virtual network. For example, when one virtual tenant network "VTN1" is configured from two virtual networks "VNW1" and "VNW2" which are managed by two controllers OFC, the situations of the two virtual networks "VNW1" and "VNW2" can be grasped by the two controllers OFC, respectively. However, because the two virtual networks "VNW1" and "VNW2" cannot be integrated, the situation of whole virtual tenant network "VTN1" could not be grasped in a unitary manner.

Therefore, an object of the present invention is to manage the whole virtual network controlled in a unitary manner by a plurality of controllers using an open flow technique.

A computer system according to an aspect of the present invention includes a plurality of controllers, switches and a managing unit. Each of the plurality of controllers calculates a communication route, sets a flow entry to each of the switches on the communication route and manages the virtual network built based on the communication route. Each of the switches carries out a relay operation of a reception packet based on the flow entry set to its own flow table. One controller of the plurality of controllers acquires from the switch, a reception notice of the packet data which is transferred between two virtual networks which are managed by the one controller and another controller, to specify a transmission virtual node and a reception virtual node of the packet data. The managing unit combines a transmission virtual node and a reception virtual node as common virtual nodes to outputs visibly.

A visualization method of a virtual network according to another aspect of the present invention is executed in a computer system which includes a plurality of controllers, each of which calculates a communication route, sets a flow entry to each of switches on the communication route, and the switches, each of which carries out a relay operation of a reception packet based on the flow entry set in its own flow table. The visualization method of the virtual network according to the present invention includes a step of acquiring, by one controller of the plurality of controllers, a reception notice of packet data which is transferred between two virtual networks which are managed by the controller and another controller from one of the switches, to specify a transmission virtual node and a reception virtual node for the packet data; and a step of combining, by a managing unit, two virtual networks by using the transmission virtual node and the reception virtual node as common virtual nodes, to output visibly.

The whole virtual network controlled by the plurality of controllers using an open flow technique according to the present invention can be managed in a unitary manner.

BRIEF DESCRIPTION OF THE DRAWINGS

An object, an effect, and characteristics of the above invention would become clearer from the description of exemplary embodiments in cooperation with the attached drawings.

FIG. 6 is a sequence diagram showing an example of the operation of acquiring the VN topology data and a corresponding virtual node data from the open flow controller by the managing unit in the present invention.

FIG. 7 is a diagram showing an example of the configuration of packet data used to specify a common virtual node in the present invention.

DESCRIPTION OF EXEMPLARY EMBODIMENTS

Figure 1:
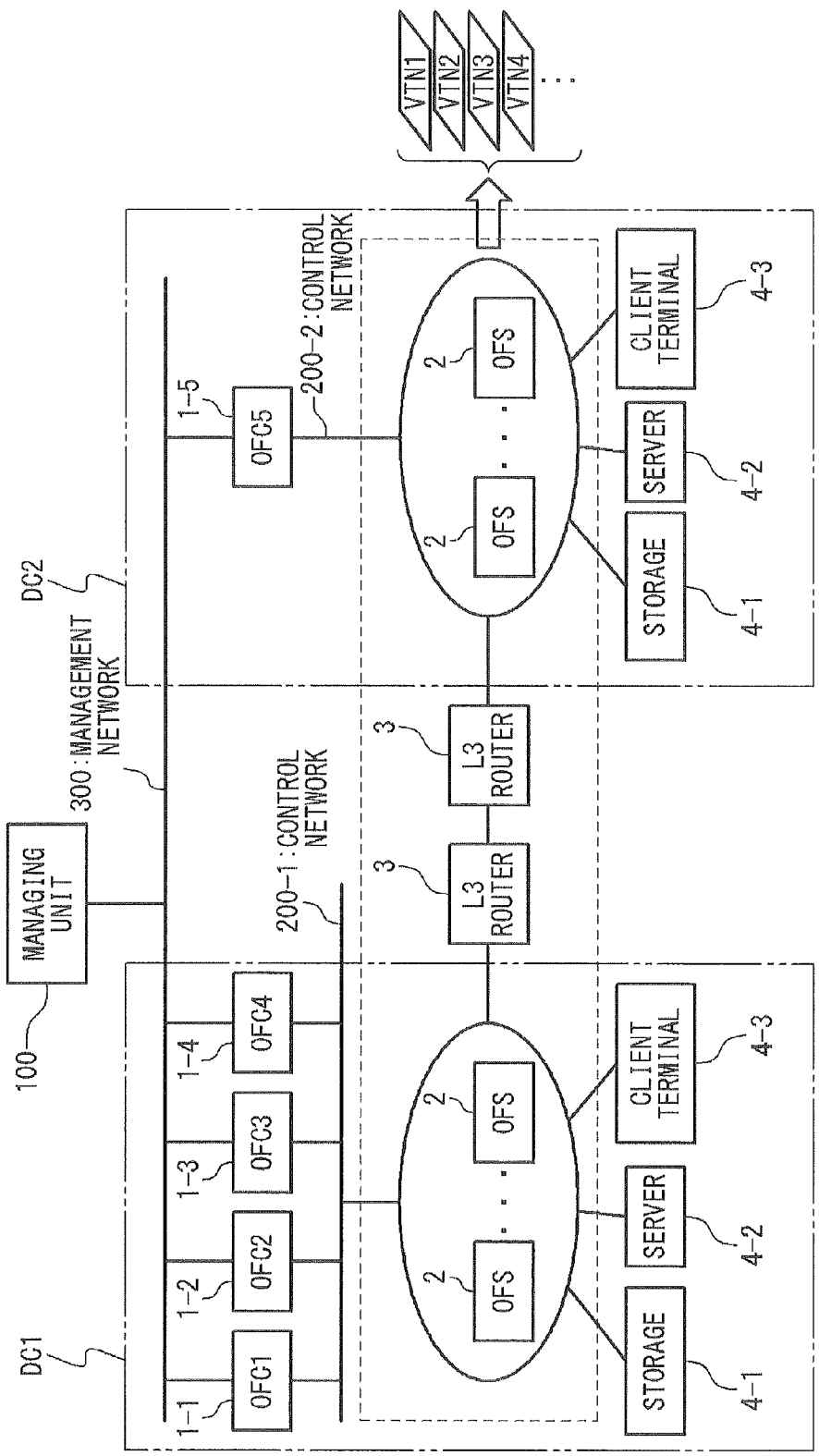
FIG. 1 is a diagram showing a configuration of a computer system according to an exemplary embodiment of the present invention.

Hereinafter, exemplary embodiments of the present invention will be described with reference to the attached drawings. In the drawings, the identical or similar reference numerals show identical or similar components.

(Configuration of Computer System)

With reference to FIG. 1, the configuration of a computer system of the present invention will be described. FIG. 1 is a diagram showing the configuration of the computer system according to an exemplary embodiment of the present invention. The computer system of the present invention carries out the building of a communication route and a transfer control of packet data by using an open flow technique. The computer system of the present invention includes open flow controllers OFC1-1 to OFC1-5, and a plurality of open flow switches OFS2, a plurality of L3 routers 3, a plurality of hosts 4 (e.g. a storage 4-1, a server 4-2, and a client terminal 4-3), a managing unit 100. Note that when the controllers OFC1-1 to OFC1-5 should be referred to collectively without distinguishing them, they are referred to as the controller OFC1.

The host 4 is either of a CPU, a main storage or a computer apparatus having an external storage, and executes a program stored in an external storage to communicate with other hosts 4. The communication among the hosts 4 is carried out through switches OFS2 and the L3 routers 3. The host 4 realizes a function exemplified by a storage 4-1, a server unit 4-2 (e.g. a Web server unit, a file server unit, an application server unit) or a client terminal 4-3, according to the program to be executed and the hardware configuration.

The controller OFC1 has a flow control section 13 which controls determination processing of a communication route for a packet transfer in the system and packet transfer processing by the open flow technique. The open flow technique is a technique that the controller (the controller OFC1 in this case) carries out a routing control and a node control by setting route data in units of layers of multi-layer and in units of flows to the switch OFS2 according to a routing policy (flow entry: rule+action) (the details should be referred to Non-Patent Literature 1). Thus, the route control function is separated from the routers and the switches, and the optimal rout control and the traffic management become possible through a central control by the controller. The switch OFS2 to which the open flow technique is applied treats communication as a flow of END2END and is not in units of packets or frames unlike a conventional router and switch.

The controller OFC1 controls an operation of the switch OFS2 (for example, a relay operation of the packet data) by setting a flow entry (rule+action) to the flow table (not shown) held by the switch OFS2. The setting of the flow entry to the switch OFS2 by the controller OFC1 and a notice (packet IN) of the first packet from the switch OFS2 to the controller OFC1 are carried out to the controller OFC1 previously set to the switch OFS2 through a control network 200 (hereinafter, to be referred to as a control NW 200).

In an example shown in FIG. 1, the controllers OFC1-1 to OFC1-4 are disposed as the controller OFC1 which controls a network (switch OFS2) in a data center DC1, and the controllers OFC1 to OFC5 are disposed as the controller OFC1 which controls the network (switch OFS2) in the data center DC2. The controllers OFC1-1 to OFC1-4 are connected through the switch OFS2 in the data center DC1 and a control NW 200-1, and the controller OFC 1-5 is connected through the switch OFS2 and a control NW 200-2 in the data center DC2. Also, the network (switch OFS2) in the data center DC1 and the network (switch OFS2) in the data center DC2 are networks (sub-networks) of different IP address ranges connected through the L3 routers 3 which carries out a routing in the layer 3.

Figure 2:
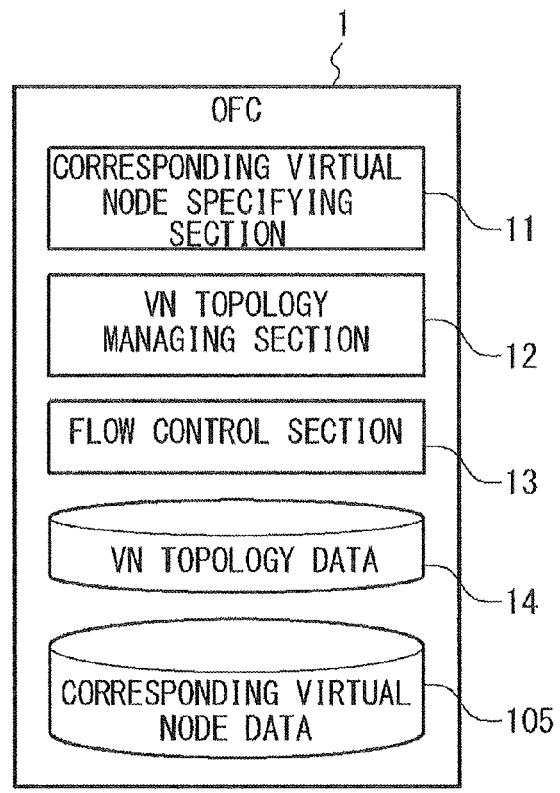
FIG. 2 is a diagram showing a configuration of an open flow controller according to an exemplary embodiment of the present invention.

With reference to FIG. 2, the detail of a configuration of the controller OFC1 will be described. FIG. 2 is a diagram showing the configuration of the controller OFC1 in the present invention. It is suitable that the controller OFC1 is realized by a computer which has a CPU and a storage. By executing a program stored in the storage by the CPU (not shown) in the controller OFC1, the functions of a corresponding virtual node specifying section 11, a virtual network (VN) topology managing section 12, and a flow control section 13 shown in FIG. 2 are realized. Also, the controller OFC1 holds VN topology data 14 stored in the storage.

The flow control section 13 carries out the setting or deletion of a flow entry (rule+action) to the switch OFS2 managed by itself. The switch OFS2 refers to the set flow entry to execute the action corresponding to a rule according to header data of a reception packet (for example, the relay operation and discard operation of the packet data). The details of the rule and action will be described later.

For example, the rule prescribes a combination of identifiers and addresses from the layer 1 to the layer 4 of the OSI (Open Systems Interconnection) reference model which are contained in the header data of the packet data in TCP/IP. For example, the combination of a physical port of the layer 1, a MAC address and a VLAN tag (VLAN id) of the layer 2, an IP address of the layer 3, and a port number of the layer 4 is set as the rule. Note that a priority (VLAN Priority) may be allocated to the VLAN tag.

The addresses and the identifiers such as the port numbers for the rule may be set in a predetermined range. Also, it is desirable to distinguishingly set a destination address and a source address for the rule. For example, a range of MAC destination addresses, a range of destination port numbers which specify an application of a connection destination, and a range of source port numbers which specify an application of a connection source are set for the rule. Also, an identifier which specifies a data transfer protocol may be set for the rule.

For example, a processing method of packet data of TCP/IP is prescribed for the action. For example, data indicating whether or not to reception packet data should be relayed, and a transmission destination when to be relayed are set. Also, data instructing to copy or discard the packet data may be set for the action.

A previously set virtual network (VN) is built up for every controller OFC1 through the flow control by the controller OFC1. Also, one virtual tenant network (VTN) is built up from at least one virtual network (VN) which is managed for every controller OFC1. For example, one virtual tenant network VTN1 is built from the virtual networks which are respectively managed by the controllers OFC 1-1 to OFC1-5 which control different IP networks. Or, one virtual tenant network VTN2 may be built from the virtual networks which are respectively managed by the controllers OFC1-1 to OFC1-4 which control an identical IP network. Moreover, the virtual network which is managed by one controller OFC1 (e.g. the controller OFC1-5) may build one virtual tenant network VTN3. Note that a plurality of virtual tenant networks (VTN) may be built in the system, as shown in FIG. 1.

The corresponding virtual node specifying section 11 specifies a corresponding virtual node in response to an instruction from the managing unit 100. The corresponding virtual node indicates a common (identical) virtual node of the virtual networks managed by the plurality of the controllers OFC1, and for example, is shown by a combination of the virtual node names specified as the common (identical) virtual node. The corresponding virtual node specifying section 11 specifies the virtual node which is common (identical) to a virtual node as each of components of a virtual network managed by its own controller, of the virtual networks managed by another controller OFC1, and records each of the virtual nodes as corresponding virtual node data 105 in the storage (not shown).

In detail, the corresponding virtual node specifying section 11 transmits a test packet to another controller OFC1, and records as the corresponding virtual node data 105, a combination of a reception virtual node name extracted from the packet IN sent from the switch OFS2 which receives a response packet and a virtual node name of the same element as that of a reception virtual node of a virtual node name in a transmission source virtual network of the test packet. Also, the corresponding virtual node specifying section 11 notifies the corresponding virtual node data 105 to the managing unit 100. The notification of the corresponding virtual node data 105 may be carried out in response to a request from the managing unit 100 and may be carried out at an optional time. The detailed operation of the corresponding virtual node specifying section 11 will be described later.

Figure 3:
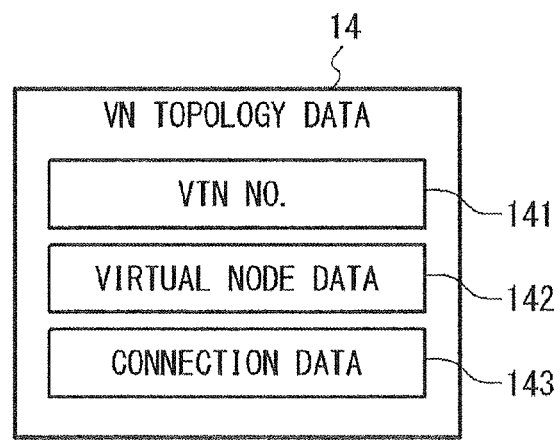
FIG. 3 is a diagram showing an example of the virtual network (VN) topology data held by the open flow controller in the present invention.
Figure 4:
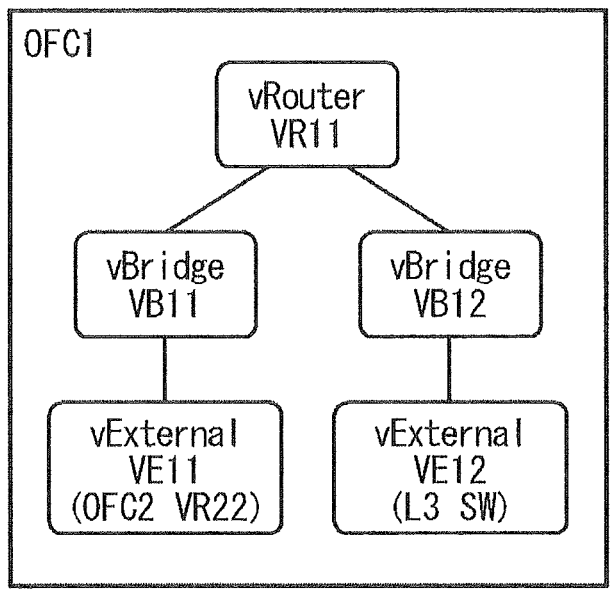
FIG. 4 is a conceptual diagram of the VN topology data held by the open flow controller in the present invention.

The VN topology managing section 12 manages VN topology data 14, i.e. topology data of the virtual network (VN) managed by the switch OFS1 to which itself belongs. Also, the VN topology managing section 12 notifies the VN topology data 14 of the virtual network which itself manages, to the managing unit 100. The VN topology data 14 contains data of a topology of the virtual network managed (controlled) by the controller OFC1, as shown in FIG. 3 and FIG. 4. With reference to FIG. 1, the computer system according to the present invention realizes a plurality of virtual tenant networks VTN1, VTN2, by being controlled by the plurality of controllers OFC1. The virtual tenant network contains the virtual networks (VN) managed (controlled) by the controllers OFC1-1 to OFC1-5. The controller OFC1 holds data of the topology of the virtual network which itself manages (hereinafter, to be referred to as a management object virtual network), as the VN topology data 14.

FIG. 3 is a diagram showing an example of the VN topology data 14 held by the controller OFC1. FIG. 4 is a conceptual diagram of the VN topology data 14 held by the controller OFC1. The VN topology data 14 contains data indicating the connection state of the virtual nodes in the virtual network which is realized by the switches OFS2 and the physical switches such as a router (not shown). Specifically, the VN topology data 14 contains the data for identifying the virtual node which belongs to the management object virtual network (virtual node data 142) and connection data 143 showing the connection state of the virtual nodes. The virtual node data 142 and the connection data 143 are recorded in correspondence with a VTN number 141 as an identifier of the virtual network to which the management object virtual network belongs.

For example, the virtual node data 142 contains data which specifies each of a virtual bridge, a virtual external, and a virtual router as the virtual node (e.g. a virtual bridge name, a virtual external name, or a virtual router name). The virtual external shows a terminal (host) and a router as a connection destination of the virtual bridge. For example, the identifier of the virtual router (virtual router name) and data of the virtual bridge connected with a lower layer router are related to each other, and are set as virtual node data 142. The virtual node names such as the virtual bridge name, the virtual external name, and the virtual router name may be peculiarly set for every controller OFC1 and the name which is common to all the controllers OFC1 in the system may be set.

The connection data 143 contains data for specifying the connection destination of the virtual node and is related to the virtual node data 142 of the virtual node. For example, referring to FIG. 4, the virtual router (vRouter) "VR11" and the virtual external (vExternal) "VE11" as the connection destination of the virtual bridge (vBridge) "VB11" are set as the connection data 143. A connection type for specifying the connection destination (bridge/external/router/external network (L3 router)) and data for specifying the connection destination (e.g. a port number, a MAC address, and a VLAN name) may be contained in the connection data 143. In detail, the VLAN name which belongs to the virtual bridge is related to the identifier of the virtual bridge (virtual bridge name) and is set as the connection data 143. Also, a combination of the VLAN name and the MAC address (or the port number) is related to the identifier of the virtual external (the virtual external name) and is set as the connection data 143. That is, the virtual external is defined by use of the combination of the VLAN name and the MAC address (or the port number).

With reference to FIG. 4, an example of the virtual network generated based on the VN topology data 14 held by the controller OFC1 will be described. The virtual network shown in FIG. 4 belongs to the virtual tenant network VTN1 and has a virtual router "VR11", virtual bridges "VB11" and "VB12", and virtual externals "VE11" and "VE12". The virtual bridges "VB11" and "VB12" are other sub-networks which are connected through the virtual router "VR11". The virtual external "VE11" is connected with the virtual bridge "VB11", and a MAC address of the virtual router "VR22" managed by the controller OFC1-2 "OFC2" is related to the virtual external "VE11". This shows that the MAC address of the virtual router "VR22" managed by the controller OFC1-2 "OFC2" can be seen from the virtual bridge "VB11". In the same way, the virtual external "VE12" is connected with the virtual bridge "VB12", and the L3 router is related to the virtual external "VE12". This shows that the virtual bridge "VB12" is connected with the external network through the L3 router.

Referring to FIG. 1, the corresponding virtual node specifying section 11 and the VN topology managing section 12 notify the corresponding virtual node data 105 and the VN topology data 14 to the managing unit 100 through the secure management network 300 (hereinafter, to be referred to as the management NW 300). The managing unit 100 combines the VN topology data 14 collected from the controllers OFC1-1 to OFC1-5 based on the corresponding virtual node data 105 and generates the virtual network of the whole system (e.g. the virtual tenant networks VTN1, VTN2, . . . ).

Figure 5:
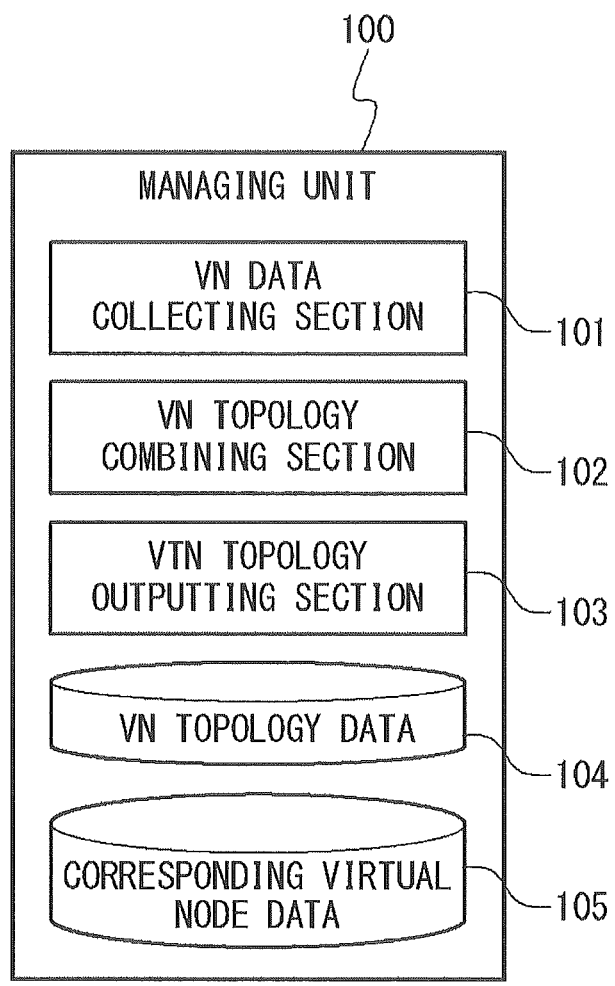
FIG. 5 is a diagram showing the configuration of a managing unit according to the exemplary embodiment of the present invention.

With reference to FIG. 5, the detail of the configuration of the managing unit 100 will be described. FIG. 5 is a diagram showing the configuration of the managing unit 100 according to the exemplary embodiment of the present invention. It is desirable that the managing unit 100 is realized by a computer which has a CPU and a storage. The managing unit 100 realizes each function of a VN data collecting section 101, a VN topology combining section 102, and a VTN topology outputting section 103 shown in FIG. 5 by executing a visualization program stored in the storage by the CPU (not shown). Also, the managing unit 100 holds the VTN topology data 104 and the corresponding virtual node data 105 which are stored in the storage. Note that the VTN topology data 104 is not held in the initial state and is recorded at the time of generation by the VN topology combining section 102. Also, the corresponding virtual node data 105 is not held in the initial state and the virtual node data 105 notified from the controller OFC1 is recorded.

The VN data collecting section 101 issues a VN topology data collection instruction to the controller OFC1 through the management NW 300 and acquires the VN topology data 14 and the corresponding virtual node data 105 from the controller OFC1. The acquired VN topology data 14 and corresponding virtual node data 105 are stored temporarily in the storage (not shown).

The VN topology combining section 102 combines (integrates) the VN topology data 14 in units of the virtual networks in the whole system (e.g. in units of the virtual tenant networks) based on the corresponding virtual node data 105, and generates the topology data corresponding to the virtual network of the whole system. The topology data generated by the VN topology combining section 102 is recorded as the VTN topology data 104 and is visibly outputted by the VTN topology outputting section 103. For example, the VTN topology outputting section 103 outputs the VTN topology data 104 to an output unit such as a monitor display (not shown) in a text form or a graphic form. The VTN topology data 104 has the configuration similar to that of the VN topology data 14 shown in FIG. 3 and contains the virtual node data and the connection data corresponding to a VTN number.

The VN topology combining section 102 specifies the virtual node which is common (identical) to the virtual node of the management object virtual network for every controller OFC1 based on the VN topology data 14 and the corresponding virtual node data 105 which are acquired from the controller OFC1. The VN topology combining section 102 is connected to the virtual network to which the virtual node belongs, through the common virtual node. Here, the VN topology combining section 102 combines the virtual networks through a virtual bridge which is common to the networks when connecting the virtual networks (subnets) in an identical IP address range. Also, the VN topology combining section 102 combines the virtual networks through a virtual external in a connection relation in the network when connecting the virtual networks (subnets) in different IP address ranges. (Combination (integration) of virtual networks)

Next, referring to FIG. 6 to FIG. 10, the detail of the combination (integration) operation of the virtual networks in the computer system according to the present invention will be described. In the present invention, the processing which specifies a common virtual node in a plurality of management object virtual networks is carried out before the combination of the virtual networks. Below, the operation of combining the virtual networks (management object networks) which are contained in the virtual tenant network "VTN1" in the computer system shown in FIG. 1 will be described as an example.

The controller OFC1 transmits a test packet from a host on a virtual bridge in its own management object network to a host on a virtual bridge in a management object network of another controller OFC1. Next, the controller OFC1 specifies a reception virtual node which is contained in a response packet (test packet reception data) of the test packet as a virtual node (corresponding virtual node) which is identical to the transmission virtual node, and notifies to the managing unit 100 together with the VN topology data 14 managed by itself. Similarly, the managing unit 100 acquires the VN topology data 14 and the corresponding virtual node data 105 from all the controllers OFC1 in the system and combines the management object virtual networks based on these data.

With reference to FIG. 6, the operation of acquiring the VN topology data 14 and the corresponding virtual node data 105 from the controller OFC1 by the managing unit 100 of the present invention will be described.

The managing unit 100 issues a VN topology data collection instruction to the controller OFC1-1 (Step S101). The VN topology data collection instruction contains data which specifies the virtual network of a visualization target (virtual tenant network "VTN1" in this case). The controller OFC1-1 carries out the processing of specifying the virtual node common to its own management object virtual network and the management object virtual network of other controller OFC1-2 to OFC1-5 in the virtual network of the visualization object shown by the VN topology data collection instruction (Step S102 to S107). Below, the operation of specifying the corresponding virtual node of the management object virtual network of the controller OFC1-1 (controller name "OFC1") and the management object virtual network of the controller OFC1-2 (controller name "OFC2") will be described.

The controller OFC1-1 transmits a test packet data request to the controller OFC1-2 in response to the VN topology data collection instruction (Step S102). The test packet data request is transmitted to the controller OFC1-2 through the management NW 300. The test packet data request contains data which specifies the virtual network of the visualization object. As an example, the test packet data request contains the data which specifies the virtual tenant network "VTN1".

With reference to FIG. 7, a specific example of the packet configuration of the test packet data request which is transmitted from the controller OFC1-1 to the controller OFC1-2 will be described. The test packet data request contains the MAC address of the controller OFC1-2 "OFC2" as a destination MAC address, the MAC address of the controller OFC1-1 "OFC1" as a source MAC address, the management IP address of the controller OFC1-2 "OFC2" as a destination IP address, the management IP address of the controller OFC1-1 "OFC1" as a transmission source MAC address, UDP (User Datagram Protocol) as a protocol and message ID=1, an identification number=X, and a VTN name=VTN1 as the UDP data. Here, the management IP address shows the IP address allocated to the controller OFC1 connected with the management NW 300. The message ID=1 shows that the packet data is a test packet data request. The identification number is an identifier relating to a destination address notice to be described later. The VTN name is data to specify the virtual network of the visualization object.

The controller OFC1-2 notifies the destination address data in response to test packet data request (Step S102). The controller OFC1-2 responds to the request when its own management object virtual network belongs to the virtual network of the VTN name which is contained in the test packet data request. On the other hand, the controller OFC1-2 does not respond and discards the request, when its own management object virtual network does not belong to the virtual network of the VTN name. When responding to the test packet data request, the controller OFC1-2 notifies the IP addresses of all the hosts which exist on the management object virtual network which belongs to the virtual network of the VTN name which is contained in the test packet data request, to the request source controller OFC1-1 as the transmission destination address data. For example, the controller OFC1-2 notifies the transmission address data through the management NW 300 as shown in FIG. 7.

With reference to FIG. 7, a specific example of the packet configuration of the test packet data which is transmitted from the controller OFC1-2 to the controller OFC1-1 will be described. The test packet data contains the MAC address of the controller OFC1-1 "OFC1" as a destination MAC address, the MAC address of the controller OFC1-2 "OFC2" as a source MAC address, the management IP address of the controller OFC1-1 "OFC1" as a destination IP address, the management IP address of the controller OFC1-2 "OFC2" as a source MAC address, UDP as a protocol, and the IP address of message ID=2, the identification number=X, the VTN name=VTN1, and the destination host of the test packet as the UDP data. Here, the message ID=2 shows that the packet data is test packet data. The identification number is assigned with an identifier ("X" in this case) showing a response to the test packet data request at step S102. The IP address of the destination host of the test packet is an IP address of the host on the virtual network which belongs to the virtual tenant network VTN1 specified by the controller OFC1-2 as the destination of the test packet. When a plurality of hosts exist on the virtual network which belongs to the virtual tenant network VTN1 as the destination of the test packet, a plurality of host IP addresses are set as the destination address data.

The controller OFC1-1 transmits the test packet having, as the transmission destination, the destination address (host IP address of the virtual tenant network VTN1) which is contained in the destination address data when receiving the destination address data (Step S104). In detail, the controller OFC1-1 specifies the destination address data required at step S102 with the identification number ("X" in this case), and transmits the test packet having, as the destination, the host IP address which is contained in the specified transmission destination address data through the virtual network specified with the VTN name. As an example, the controller OFC1-1 transmits the test packet as shown in FIG. 7 through the virtual tenant network VTN1 shown in FIG. 8.

With reference to FIG. 7, a specific example of the packet configuration of the test packet which is transmitted from the host on the management object virtual network of the controller OFC1-1 to the host on the management object virtual network of the controller OFC1-2 will be described. The test packet contains the MAC address of the host managed as the destination MAC address by the controller OFC1-2 "OFC2" on the virtual tenant network "VTN1", the MAC address of the host managed as the source MAC address by the controller OFC1-1 "OFC1" on the virtual tenant network "VTN1", the IP address of the host managed as the destination IP address by the controller OFC1-2 "OFC2" on the virtual tenant network "VTN1", the IP address of the host managed as the transmission source IP address by the controller OFC1-1 "OFC1" on the virtual tenant network "VTN1", UDP (User Datagram Protocol) as a protocol, and, the message ID=3, the identification number=Y, and a VTN name=VTN1 as the UDP data. Here, the IP address of the destination host is an IP address acquired by the controller OFC1-1 by a transmission destination address notice. The message ID=3 shows that the packet data is the test packet. The identification number is an identifier which is related to a test packet reception notice to be described later.

The controller OFC1-1 is under the control of itself and transmits the test packet through the control NW 200-1 to the switch OFS2-1 configuring a virtual bridge which belongs to the virtual tenant network "VTN1". Now, the controller OFC1-1 sets a flow entry for the test packet to be transferred on the virtual tenant network "VTN1" to the switch OFS2-1. Thus, the test packet is transferred to the destination host through the virtual tenant network "VTN1".

The test packet which is transferred through the virtual tenant network "VTN1" is received by the switch OFS2-2 under the control of the controller OFC1-2. Because there is not any flow entry which matches the received test packet, the switch OFS2-2 notifies the test packet to the controller OFC1-2 as the first packet (packet IN, step S105). Here, the packet IN to the controller OFC1-2 is carried out through the control NW 200-1. The controller OFC1-2 acquires the test packet received in the switch OFS2-2 by the packet IN from the switch OFS2-2. Also, in case of the packet IN, the switch OFS2-2 notifies the VLAN name and the port number allocated to the port receiving the test packet to the controller OFC1-2. The controller OFC1-2 can specify the virtual bridge to which the switch OFS2 receiving the test packet belongs (that is, the virtual bridge receiving the test packet) based on the notified VLAN name and the VN topology data 14. Also, the controller OFC1-2 can specify the virtual external receiving the test packet based on the notified VLAN name and the source host MAC address of the test packet and the VN topology data 14.

The controller OFC1-2 transmits the test packet reception data, showing the reception of the test packet to the source host of the test packet (Step S106). In detail, the controller OFC1-2 sets to the switch OFS2-2, a flow entry for transmitting the test packet reception data to the switch OFS2-1 through the control NW 200-1 and transferring the test packet reception data on the virtual tenant network "VTN1". Thus, the test packet reception data is transferred to the source host through the virtual tenant network "VTN1".

The controller OFC1-2 specifies names of the virtual bridge and virtual external which have received the test packet based on the VLAN name and the port number notified with the packet IN, and controls the test packet reception data which contains them to be transferred from the switch OFS2-2. The controller OFC1-2 sets the destination host of the test packet as the source of the test packet reception data and sets the source host of the test packet as the destination of the test packet reception data. As an example, the controller OFC1-2 transmits the test packet reception data shown in FIG. 7 through the virtual tenant network VTN1 shown in FIG. 8.

With reference to FIG. 7, a specific example of the packet configuration of the test packet reception data will be described. The test packet reception data contains the MAC address of the host managed as the destination MAC address by the controller OFC1-1 "OFC1" on the virtual tenant network "VTN1", the MAC address of the host managed as the source MAC address by the controller OFC1-2 "OFC2" on the virtual tenant network "VTN1", the IP address of the host managed as the destination IP address by the controller OFC1-1 "OFC1" on the virtual tenant network "VTN1", the IP address of the host managed as the source IP address by the controller OFC1-2 "OFC2" on the virtual tenant network "VTN1", UDP (User Datagram Protocol) as a protocol, and the message ID=4, the identification number=Y, the VTN name=VTN1, a reception vBridge name, and a reception vExternal name as the UDP data. Here, the MAC address and IP address of the transmission destination host are a MAC address and an IP address of the transmission source host of the test packet. The message ID=4 shows that the packet data is the test packet reception data. The identification number is given the identifier ("Y" in this case) showing the response of the test packet. The reception vBridge name and the reception vExternal name are names to identify the virtual bridge and the virtual external which receive the test packet specified in the controller OFC1-2.

The test packet reception data which is transferred through the virtual tenant network "VTN1" is received by the switch OFS2-2 under the control of the controller OFC1-1. Because there is no flow entry which conforms with the received test packet reception data, the switch OFS2-1 notifies the test packet reception data to the controller OFC1-1 as a first packet (packet IN, step S107). Here, the packet IN to the controller OFC1-1 is carried out through the control NW 200-1. The controller OFC1-1 acquires the test packet reception data received in the switch OFS2-1 from the packet IN sent from the switch OFS2-1. Also, in case of the packet IN, the switch OFS2-1 notifies the VLAN name allocated to a port receiving the test packet reception data and the port number to the controller OFC1-1. The controller OFC1-1 specifies a virtual bridge to which the switch OFS2 receiving the test packet belongs (that is, a virtual bridge which has received the test packet) based on the notified VLAN name and the VN topology data 14. Also, the controller OFC1-1 specifies a virtual external which has received the test packet, based on the notified VLAN name, a MAC address of the transmission source host of the test packet, and the VN topology data 14.

The controller OFC1-1 relates the reception virtual bridge name and the reception virtual external name contained in the test packet reception data, and a reception virtual bridge name and a reception virtual external name of the test packet reception data specified based on the packet IN from the switch OFS2-1 (that is, a transmission virtual bridge name and a transmission virtual external name of the test packet) to record as the corresponding virtual node data 105 (step s108). At this time, when the transmission destination address notified from another controller OFC1 is within an IP address range which contains the IP address allocated to the network managed by itself, the controller OFC1-1 regards that the management object virtual network of the controller OFC1 and its own management object virtual network are in the L2 connection. In this case, the controller OFC1-1 relates the reception virtual bridge and the transmission virtual bridge of the test packet to each other to record as corresponding virtual node data 105. On the other hand, when the transmission destination address notified from another controller OFC1 is within an IP address range different from the IP address allocated to the network managed by it, the controller OFC1-1 regards that the management object virtual network of the controller OFC1 and its own management object virtual network are in an L3 connection. In this case, the controller OFC1-1 relates the reception virtual external and the transmission virtual external of the test packet to each other to record as corresponding virtual node data 105. The managing unit 100 can specify the virtual nodes common to the management object virtual networks (the virtual bridge and the virtual external) of the controller OFC1-1 and the controller OFC1-2 in the virtual tenant network "VTN1" based on the corresponding virtual node data 105.

The controller OFC1-1 transmits to the managing unit 100, the VN topology data 14 of the management object virtual network which belongs to the virtual network of the visualization object instructed at step S101, and the corresponding virtual node data 105 recorded at step S108. In this case, the VN topology data 14 of the management object virtual network of the controller OFC1-1 which belongs to the virtual tenant network "VTN1" and the corresponding virtual node data 105 which specifies the virtual node common to the management object virtual networks of the controller OFC1-1 and the controller OFC1-2 are transmitted to the managing unit 100.

As mentioned above, the present invention specifies the reception virtual bridge and the reception virtual external which have received the packet on the virtual network based on the packet IN from the switch OFS2 which is one of the functions of the open flow technique. Also, the controller OFC1 specifies as the common virtual bridge and virtual external, the virtual bridge and the virtual external which have received the test packet reception data in which a source host and a destination host of the test packet are exchanged and the virtual bridge and the virtual external which have received the test packet.

The controller OFC1-1 transmits the test packet to other controllers OFC1-3 to OFC1-5 in the same way. The controller OFC1-1 specifies the virtual nodes (the virtual bridge, the virtual external) which are common to its own management object network in the virtual tenant network "VNT1" based on the test packet reception data, to notify to the managing unit 100 as the corresponding virtual node data.

In the same way, the other controllers OFC1-2 to OFC1-5 notify to the managing unit 100, the VN topology data 14 of the management object virtual network managed by itself and the corresponding virtual node data 105 generated in the same method as the above.

Figure 8:
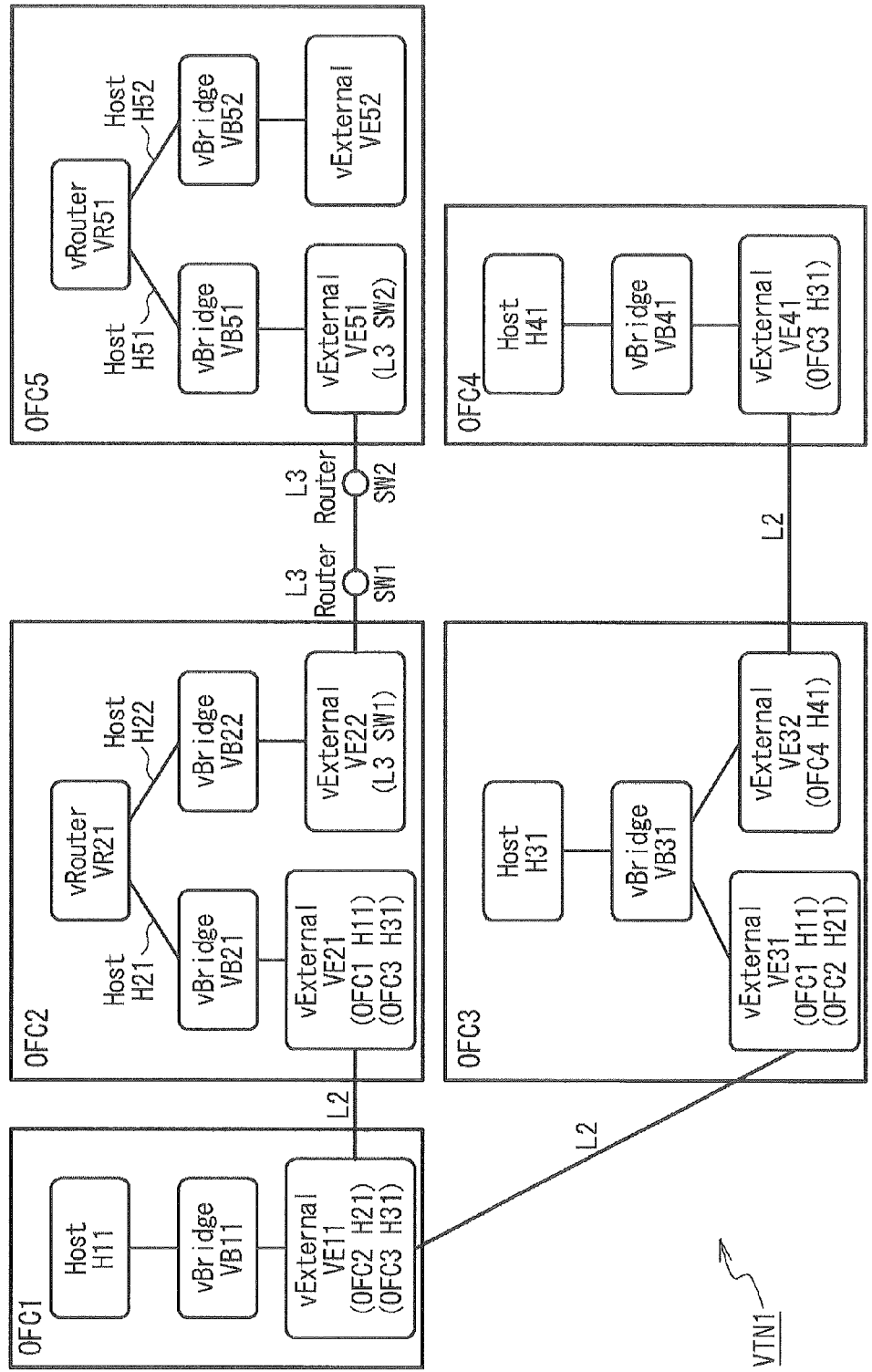
FIG. 8 is a diagram showing an example of the VN topology data held by each of the plurality of open flow controllers shown in FIG. 1.

Next, a specific example of a visualizing method as one virtual tenant network by combining the management object virtual nodes shown in FIG. 8 will be described. FIG. 8 is a diagram showing an example of the VN topology data 14 of the management object virtual network which belongs to the virtual tenant network VTN1 held by each of the plurality of controllers OFC1-1 to OFC1-5 shown in FIG. 1.

With reference to FIG. 8, the controller OFC1-1 "OFC1" holds a virtual bridge "VB11" mutually connected and a virtual external "VE11" as the VN topology data 14 of its own management object virtual network. The host "H11" is connected with the virtual bridge "VB11". The controller OFC1-2 "OFC2" holds a virtual router "VR21", virtual bridges "VB21" and "VB22", and virtual externals "VE21" and "VE22" as the VN topology data 14 of its own management object virtual network. The virtual bridges "VB21" and "VB22" show other sub-networks which are connected through a virtual router "VR21". The connection node of the virtual router "VR21" and the virtual bridge "VB21" shows the host "H21", and the connection node of the virtual router "VR21" and the virtual bridge "VB22" shows the host "H22". The virtual external "VE21" is connected with the virtual bridge "VB21". The virtual external "VE22" is connected with the virtual bridge "VB22", and an L3 router "SW1" is related to the virtual external "VE22". The controller OFC1-3 "OFC3" holds a virtual bridge "VE31", and virtual externals "VE31" and "VE32" as the VN topology data 14 of its own management object virtual network. The host "H31" is connected with the virtual bridge "VB31". The controller OFC1-4 "OFC4" holds a virtual bridge "VB41" and a virtual external "VE41" as the VN topology data 14 of its own management object virtual network. The host "H41" is connected with the virtual bridge "VB41". The controller OFC1-5 "OFC5" holds a virtual router "VR51", virtual bridges "VB51" and "VB52", and virtual externals "VE51" and "VE52" as the VN topology data 14 of its own management object virtual network. The virtual bridges "VB51" and "VB52" show other sub-networks which are connected through the virtual router "VR51". The connection node of the virtual router "VR21" and the virtual bridge "VB21" shows the host "H21", and the connection node of the virtual router "VR21" and the virtual bridge "VB22" shows the host "H22". The virtual external "VE51" is connected with the virtual bridge "VB51" and an L3 router "SW2" is related to the virtual external "VE51". The virtual external "VE52" is connected with the virtual bridge "VB52".

When the management object virtual network to which the virtual tenant network "VTN1" of the visualization object belongs is managed like FIG. 8, the controllers OFC1-2 to OFC1-5 returns the hosts "H21", "H22", "H31", "H41", "H51", and "H52" in response to the test packet data request from the controller OFC1-1 "OFC1" as the respective destination addresses. The controller OFC1-1 transmits the test packet having the source host of the host "H11" to the hosts "H21", "H22", "H31", "H41", "H51", and "H52" managed by the controllers OFC1-2 to OFC1-5, and specifies a virtual node common among the management object virtual networks (corresponding virtual node) in the operation similar to that of FIG. 6. Generally, the packet other than the test packet is handed to the TCP/IP protocol stack and is transferred. On the other hand, the relay processing to the test packet according to the present invention is carried out in the virtual network immediately before the TCP/IP protocol stack. Therefore, the test packet is not handed to the TCP/IP protocol stack and is sent back as a response packet to the transmission source. The test packets destined to the host "H22", "H51", and "H52" in the virtual tenant network "VTN1" shown in FIG. 8 are discarded by the virtual router "VR21" on the transfer way, and the test packet destined to the host "H41" is discarded by the virtual external "VE32". In this case, the test packet reception data is transmitted only from the hosts "H21" and "H31".

Figure 9:
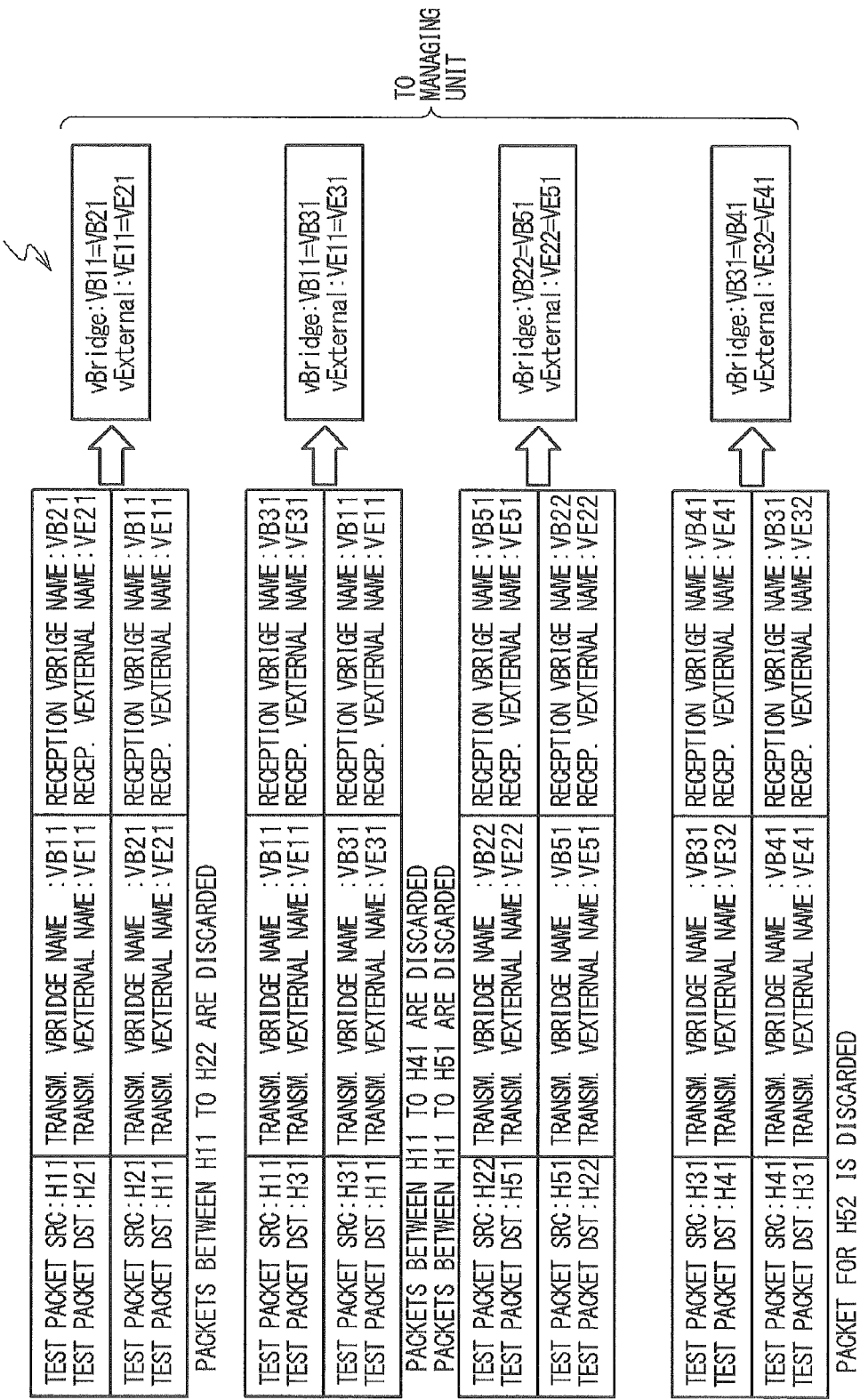
FIG. 9 is a diagram showing an example of corresponding virtual node data specified by corresponding virtual node specifying processing.

Referring to FIG. 9, an example of the corresponding virtual node specified by the test packet will be described, wherein the virtual bridge and the virtual external which receive the test packet are supposed to be the reception virtual bridge and the reception virtual external, and the virtual bridge and the virtual external which receive the test packet reception data are supposed to be the transmission virtual bridge and the transmission virtual external.

Because the transmission virtual bridge is "VB11" and the reception virtual bridge is "VB21" as the result of the test packet having the host "H11" as the transmission source host and the host "H21" as the destination host, it is specified that the virtual bridges "VB11" and "VB21" are common virtual bridges. In the same way, it is specified that the virtual bridges "VB11" and "VB21" are the common virtual bridges even if the source and the destination are exchanged in the test packet.

Also, the transmission virtual bridge is "VB11" and the reception virtual bridge is "VB31" by the test packet having the host "H11" as the transmission source and the host "H31" as the destination host. Therefore, it is specified that the virtual bridges "VB11" and "VB31" are common virtual bridges. In the same way, it is specified that the virtual bridges "VB11" and "VB21" are common virtual bridges, by exchanging the source and the destination in the test packet.

Moreover, the transmission virtual bridge is "VB22" and the reception virtual bridge is "VB51" by use of the test packet having the source host of "H22" and the destination host of "H51". Here, when a transmission destination address notified from the controller OFC1-5 as a transmission destination is different from an IP address range allocated to the network managed by the controller OFC1-2, the controller OFC1-2 carries out specification processing of the corresponding virtual node under the assumption that the host "H22" and the host "H51" are in the L3 connection. In this case, the transmission virtual external and the reception virtual external are specified as corresponding virtual externals. In this case, because the transmission virtual external is "VE22" and the reception virtual external is "VE51", it is specified that the virtual externals "VE22" and "VE51" are the common virtual externals. In the same way, it is specified that the virtual external "VE22" and "VE51" are common virtual bridges in the test packet in which the transmission source and the destination are exchanged.

Moreover, because the transmission virtual bridge is "VB31" and the reception virtual bridge is "VB41" by use of the test packet having the transmission source host of "H31" and the destination host of "H41", it is specified that the virtual bridges "VB31" and "VB41" are common virtual bridges. In the same way, it is specified the virtual bridges "VB31" and "VB41" are common virtual bridges by the test packet in which the transmission source and the destination are exchanged.

Figure 10:
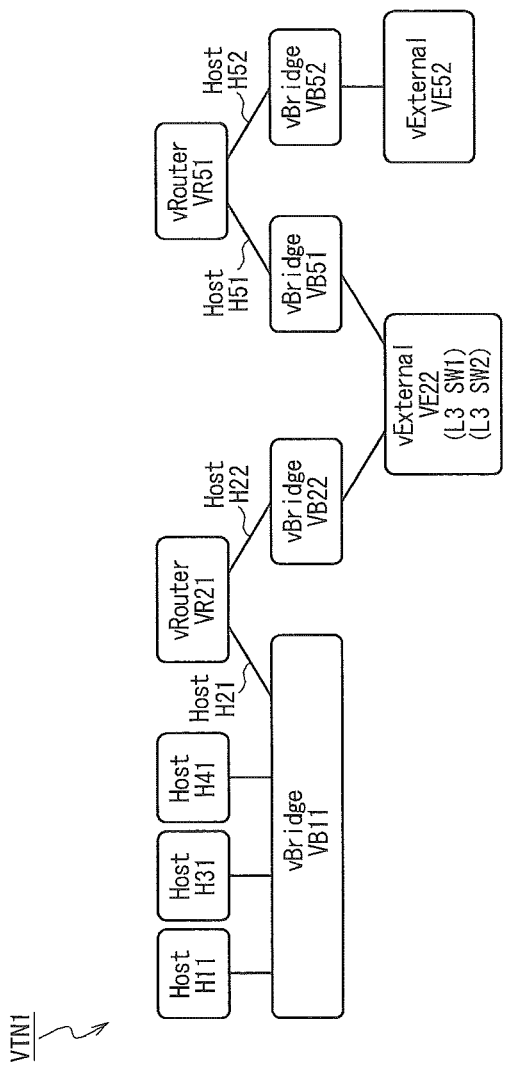
FIG. 10 is a diagram showing an example of the VTN topology data of the whole virtual network generated by integrating the VN topology data shown in FIG. 9.

As mentioned above, the managing unit 100 can generate the topology data of the virtual tenant network "VTN1" shown in FIG. 10, by combining the VN topology data 14 transmitted from each of the controllers OFC1-1 to OFC1-5 based on data of the specified corresponding virtual nodes (corresponding virtual node data 105).

With reference to FIG. 10, the virtual bridges "VB11", "VB21" and "VB31" managed by the controller OFC1-1 to OFC1-3 are recognized as a common virtual bridge "VB11" to which the hosts "H11", "H21", "H31" and "H41" are connected. Also, the virtual external "VE22" and "VB51" managed by the controllers OFC1-2 and OFC1-5 are recognized as the common virtual external "VE22" with which the virtual bridges "VB21" and "VB51" are connected. In this way, the managing unit 100 can generate the topology data of the specified virtual tenant network "VTN1" by combining the VN topology data 14 managed for every controller OFC1 through the common virtual node and can output visibly. Thus, a network administrator can manage the topology of the virtual networks in the whole system shown in FIG. 1 in a unitary manner.

The collection of the VN topology data 14 and the corresponding virtual node data 105 by the managing unit 100 may be executed at an optional time or regularly. When being regularly carried out, the change of the network topology can be automatically carried out in association with the change of the virtual network.

As above, the exemplary embodiments of the present invention have been described in detail. However, a specific configuration is not limited to the above exemplary embodiments and a modification within a range of the concept of the present invention is contained in the present invention. For example, the managing unit 100 shown in FIG. 1 is provided separately from the controller OFC1 but may be provided in either of the controllers OFC1-1 to OFC1-5. Also, in the computer system of FIG. 1, an example is shown in which five controllers OFC1 are provided but the number of the controllers OFC1 and the number of the hosts 4 which are connected with the network are not limited to the values. Moreover, the managing unit 100 may collect and hold the VN topology data 14 managed for every controller OFC1 earlier than the acquisition of the corresponding virtual node data 105.

Note that when the virtual network is set as a backup system of the operation system, the controller OFC1 managing the virtual network may notify a host address of the virtual bridge of the backup system in addition to the host address of the virtual bridge of the operation system as the destination address of the test packet. For example, the controller OFC1 acquires the host address of the backup system by including the data requesting the host address of the backup system in the test packet data request and sets the virtual network of the backup system to a communication allowable state. It becomes possible to confirm the topology of the backup system, by the same method as mentioned above.

Note that this patent application claims a priority based on Japan Patent Application No. JP 2012-027780. The disclosure thereof is incorporated herein by reference.

The invention claimed is:

1. A computer system comprising:
a plurality of controllers, each of which is configured to calculate a communication route, set a flow entry to each of switches on the communication route and manage a virtual network which is built based on the communication route;
said switches, each of which is configured to carry out a relay operation of a reception packet based on the flow entry set to its own flow table; and
an external managing unit configured to combine a plurality of said virtual networks managed by said plurality of controllers to output visibly,
wherein one controller of said plurality of controllers acquires a reception notice of packet data which is transferred between two of said plurality of virtual networks managed by said one controller and another controller of said plurality of controllers from one of said switches, to specify a transmission virtual node and a reception virtual node of the packet data, and
wherein said external managing unit combines said two virtual networks by using the transmission virtual node and the reception virtual node as common virtual nodes, to output visibly.

2. The computer system according to claim 1,
wherein a first controller of two controllers as said one controller and said another controller transfers a test packet from a first host on a first virtual network of the two virtual networks which is managed by said first controller to a second host on a second virtual network of the two virtual networks which is managed by a second controller of the two controllers,
wherein said second controller specifies a virtual node receiving the test packet in said second virtual network as a reception virtual node based on the test packet notified from said switch which has received the test packet and topology data of said second virtual network, and transfers test packet reception data including data of the reception virtual node from said second host to said first host, and
wherein said first controller specifies a virtual node receiving the test packet reception data in said first virtual network based on the test packet reception data notified from said switch which has received the test packet reception data and topology data of said first virtual network, and relates the transmission virtual node and the reception virtual node contained in the test packet reception data to each other, to notify to said external managing unit as corresponding virtual node data.

3. The computer system according to claim 2,
wherein said virtual node comprises a virtual bridge,
wherein a combination of a transmission virtual bridge and a reception virtual bridge which correspond to each other is set to corresponding virtual node data,
wherein said external managing unit specifies a virtual bridge common to said plurality of virtual networks based on topology data of said plurality of virtual networks and the corresponding virtual node data, and combines said plurality of virtual networks through said common virtual bridge.

4. The computer system according to claim 3,
wherein said virtual node comprises a virtual external which is viewed as a connection destination of said virtual bridge,
wherein a combination of a corresponding transmission virtual external and a corresponding reception virtual external is set to the virtual node data,
wherein said external managing unit specifies a virtual external which is common to said plurality of virtual network based on the topology data of said plurality of virtual networks and said corresponding virtual node data, and combines said plurality of virtual networks through the common virtual external.

5. The computer system according to claim 1,
wherein said controller holds the topology data of the virtual network set by relating a VLAN name to the virtual node,
wherein said switch notifies the VLAN name allocated to a port which has received the packet data, to the controller, in notification of the reception of the packet data,
wherein said controller specifies the virtual node which has received the packet data, by using a VLAN name based on the topology data.

6. The computer system according to claim 1,
wherein said external managing unit is arranged in either of said plurality of controllers.

7. The computer system according to claim 1,
wherein a first controller of two controllers as said one controller and said another controller transfers a test packet from a first host on a first virtual network of the two virtual networks which is managed by said first controller to a second host on a second virtual network of the two virtual networks which is managed by a second controller of the two controllers.

8. The computer system according to claim 7,
wherein said second controller specifies a virtual node receiving the test packet in said second virtual network as a reception virtual node based on the test packet notified from said switch which has received the test packet and topology data of said second virtual network, and transfers test packet reception data including data of the reception virtual node from said second host to said first host.

9. The computer system according to claim 7,
wherein said first controller specifies a virtual node receiving the test packet reception data in said first virtual network based on the test packet reception data notified from said switch which has received the test packet reception data and topology data of said first virtual network, and relates the transmission virtual node and the reception virtual node contained in the test packet reception data to each other, to notify to said external managing unit as corresponding virtual node data.

10. A visualization method of a virtual network, executed by a computer system which comprises:
a plurality of controller, each of which is configured to calculate a communication route, set a flow entry to each of switches on the communication route and manage a virtual network built based on the communication route; and the switches, each of which carries out a relay operation of a reception packet based on the flow entry set to its own flow table,
said visualization method comprising:
a controller acquiring from said switch, a reception notice of packet data transferred between two of the virtual networks which are managed by said controller and another controller of said plurality of controllers, to specify a transmission virtual node and a reception virtual node of the packet data; and
said external managing unit combining said two virtual networks by using the transmission virtual node and the reception virtual node as common virtual nodes, to output visibly.

11. The visualization method according to claim 10, further comprising:
transferring a test packet from a first host on a first virtual network of the two virtual networks which is managed by a first controller as one of said two controllers to a second host on a second virtual network of the two virtual networks which is managed by a second controller as the other of said two controllers;
specifying, by said second controller, a virtual node receiving the test packet as a reception virtual node based on the test packet notified from a switch which has received the test packet and topology data of said second virtual network managed by said second controller;
transferring by said second controller, test packet reception data including data of the reception virtual node from the second host to the first host;
specifying by said first controller, the virtual node receiving the test packet in said first virtual network as the transmission virtual node based on the test packet reception data notified from said switch which has received the test packet reception data and topology data of said first virtual network managed by said first controller; and
relating by said first controller, the transmission virtual node and the reception virtual node contained in the test packet reception data to each other, to notify to said external managing unit as corresponding virtual node data.

12. The visualization method according to claim 11,
wherein said virtual node comprises a virtual bridge,
wherein a combination of a transmission virtual bridge and a reception virtual bridge which correspond to each other is set to the corresponding virtual node data,
wherein said combining said plurality of virtual networks to output visibly comprises:
specifying by said the external managing unit, the virtual bridge which is common to said plurality of virtual networks, based on the topology data of said plurality of virtual networks and the corresponding virtual node data; and
combining by said external managing unit, said plurality of virtual networks through said common virtual bridge.

13. The visualization method according to claim 12,
wherein said virtual node comprises a virtual external which can be viewed as a connection destination of said virtual bridge,
wherein a combination of a transmission virtual external and a reception virtual external which correspond to each other is set to the virtual node data,
wherein said combining said plurality of virtual networks to output visibly comprises:

specifying by said external managing unit, a virtual external which is common to said plurality of virtual networks based on the topology data of said plurality of virtual networks and the corresponding virtual node data; and combining by said external managing unit, said plurality of virtual networks through said common virtual external.

14. The visualization method according to claim 10,
wherein said controller holds the topology data of the virtual network in which a VLAN name and a virtual node are related to each other and set, wherein the visualization method further comprises:

notifying by said switch, the VLAN name allocated to a port receiving the packet data to said controller in notification of the reception of the packet data;

specifying by said controller, the virtual node receiving the packet data by using the VLAN name, based on the topology data; and combining by said external managing unit, said plurality of virtual networks through the common virtual node.

15. The visualization method according to claim 10, further comprising:

transferring a test packet from a first host on a first virtual network of the two virtual networks which is managed by a first controller as one of said two controllers to a second host on a second virtual network of the two virtual networks which is managed by a second controller as the other of said two controllers.

16. The visualization method according to claim 15, further comprising:

specifying, by said second controller, a virtual node receiving the test packet as a reception virtual node based on the test packet notified from a switch which has received the test packet and topology data of said second virtual network managed by said second controller.

17. The visualization method according to claim 15, further comprising:

transferring by said second controller, test packet reception data including data of a reception virtual node from the second host to the first host;

specifying by said first controller, a virtual node receiving the test packet in said first virtual network as a transmission virtual node based on the test packet reception data notified from said switch which has received the test packet reception data and topology data of said first virtual network managed by said first controller; and relating by said first controller, the transmission virtual node and the reception virtual node contained in the test packet reception data to each other, to notify to said external managing unit as corresponding virtual node data.

* * * * *